United States Patent
Pun et al.

(10) Patent No.: US 7,804,897 B1
(45) Date of Patent: Sep. 28, 2010

(54) METHOD FOR IMPLEMENTING AN IMPROVED QUANTIZER IN A MULTIMEDIA COMPRESSION AND ENCODING SYSTEM

(75) Inventors: Thomas Pun, San Jose, CA (US);
Xiaochun Nie, Cupertino, CA (US);
Hsi-Jung Wu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 935 days.

(21) Appl. No.: 10/716,265

(22) Filed: Nov. 17, 2003

Related U.S. Application Data

(60) Provisional application No. 60/433,915, filed on Dec. 16, 2002, provisional application No. 60/434,322, filed on Dec. 18, 2002.

(51) Int. Cl.
*H04N 7/26* (2006.01)
*H04N 7/46* (2006.01)

(52) U.S. Cl. .................... 375/240.04; 375/240.03; 375/240.24

(58) Field of Classification Search ... 375/240.3–240.5, 375/240.16, 240.03
See application file for complete search history.

(56) References Cited

U.S. PATENT DOCUMENTS

| | | | | |
|---|---|---|---|---|
| 5,038,209 A | * | 8/1991 | Hang | 375/240.05 |
| 5,164,828 A | * | 11/1992 | Tahara et al. | 375/240.13 |
| 5,231,484 A | | 7/1993 | Gonzales et al. | |
| 5,241,383 A | * | 8/1993 | Chen et al. | 375/240.04 |
| 5,333,012 A | * | 7/1994 | Singhal et al. | 375/240.04 |
| 5,469,208 A | * | 11/1995 | Dea | 348/27 |
| 5,623,308 A | | 4/1997 | Civanlar et al. | |
| 5,650,860 A | | 7/1997 | Uz | |
| 5,654,760 A | | 8/1997 | Ohtsuki | |
| 5,677,969 A | * | 10/1997 | Auyeung et al. | 382/239 |
| 5,726,711 A | | 3/1998 | Boyce | |
| 5,790,196 A | * | 8/1998 | Sun et al. | 375/240.05 |

(Continued)

FOREIGN PATENT DOCUMENTS

EP    1091588 A1 *  4/2001

(Continued)

OTHER PUBLICATIONS

IEEE 100: The Authoritative Dictionary of IEEE Standards Terms, 7th ed._ New York: IEEE 2000.*

(Continued)

*Primary Examiner*—Mehrdad Dastouri
*Assistant Examiner*—David N Werner
(74) *Attorney, Agent, or Firm*—Adeli & Tollen LLP

(57) ABSTRACT

Some embodiments limit the changes to a buffer occupancy accumulator with respect to a target number of bits of the current frame. Limiting the change of the buffer occupancy accumulator will prevent one odd significantly different frame from significantly changing the quantization. Some embodiments improve upon the quantizer adjustment by making more accurate estimates of the amount of information needed to encode each macroblock. Specifically, some embodiments estimate the bits per macroblock in a manner that varies from frame type to frame type. Specifically, for frame types with motion compensation, some embodiments exploit the correlation between the complexity of the macroblock and the number of bits needed. In the case of frame types without motion compensation, some embodiments impose a model that biases bit allocation towards smaller activity macro blocks.

22 Claims, 5 Drawing Sheets

U.S. PATENT DOCUMENTS

| | | | |
|---|---|---|---|
| 5,847,766 | A | 12/1998 | Peak |
| 5,872,598 | A | 2/1999 | Legall et al. |
| 5,929,914 | A | 7/1999 | Normand |
| 5,929,916 | A * | 7/1999 | Legall et al. ........... 375/240.05 |
| 5,937,138 | A * | 8/1999 | Fukuda et al. ............... 386/112 |
| 5,986,712 | A | 11/1999 | Peterson et al. |
| 5,990,958 | A | 11/1999 | Bheda et al. |
| 6,014,181 | A | 1/2000 | Sun |
| 6,023,296 | A * | 2/2000 | Lee et al. ................ 375/240.05 |
| 6,125,147 | A | 9/2000 | Florencio et al. |
| 6,134,663 | A | 10/2000 | Nakamura et al. |
| 6,141,448 | A | 10/2000 | Khansari et al. |
| 6,160,846 | A * | 12/2000 | Chiang et al. .......... 375/240.05 |
| 6,167,085 | A * | 12/2000 | Saunders et al. ....... 375/240.03 |
| 6,198,878 | B1 * | 3/2001 | Blawat et al. ............... 386/111 |
| 6,212,233 | B1 | 4/2001 | Alexandre et al. |
| 6,226,326 | B1 | 5/2001 | Mihara |
| 6,229,849 | B1 * | 5/2001 | Mihara ................... 375/240.05 |
| 6,263,020 | B1 * | 7/2001 | Gardos et al. .......... 375/240.03 |
| 6,282,241 | B1 * | 8/2001 | Saw ....................... 375/240.01 |
| 6,310,897 | B1 | 10/2001 | Watanabe et al. |
| 6,324,217 | B1 | 11/2001 | Gordon |
| 6,347,117 | B1 | 2/2002 | Kato et al. |
| 6,480,539 | B1 | 11/2002 | Ramaswamy |
| 6,510,176 | B1 | 1/2003 | Fukuda et al. |
| 6,535,251 | B1 | 3/2003 | Ribas-Corbera |
| 6,587,506 | B1 * | 7/2003 | Noridomi et al. ....... 375/240.12 |
| 6,639,942 | B1 | 10/2003 | Bayazit |
| 6,694,060 | B2 | 2/2004 | Liu et al. |
| 6,763,067 | B2 | 7/2004 | Hurst |
| 6,831,947 | B2 * | 12/2004 | Ribas Corbera ........ 375/240.03 |
| 6,847,656 | B1 * | 1/2005 | Wu et al. ..................... 370/477 |
| 6,944,221 | B1 | 9/2005 | Keesman |
| 6,961,376 | B2 * | 11/2005 | Wu et al. ................ 375/240.12 |
| 6,961,378 | B1 * | 11/2005 | Greenfield et al. ..... 375/240.16 |
| 6,963,608 | B1 | 11/2005 | Wu |
| 7,079,581 | B2 * | 7/2006 | Noh et al. .............. 375/240.16 |
| 7,103,099 | B1 | 9/2006 | Paz et al. |
| 7,277,595 | B1 | 10/2007 | Reid |
| 7,418,037 | B1 | 8/2008 | Nie et al. |
| 2001/0000704 | A1 | 5/2001 | Fert et al. |
| 2001/0031002 | A1 | 10/2001 | Hashimoto et al. |
| 2002/0001344 | A1 | 1/2002 | Morris et al. |
| 2002/0012395 | A1 * | 1/2002 | Song et al. ............. 375/240.03 |
| 2002/0067768 | A1 | 6/2002 | Hurst |
| 2002/0085636 | A1 * | 7/2002 | Uenoyama et al. ..... 375/240.12 |
| 2002/0094082 | A1 | 7/2002 | Jones et al. |
| 2002/0126752 | A1 * | 9/2002 | Kim ...................... 375/240.03 |
| 2002/0136295 | A1 * | 9/2002 | Sato ...................... 375/240.03 |
| 2002/0136304 | A1 * | 9/2002 | Akhan et al. ........... 375/240.16 |
| 2002/0163964 | A1 * | 11/2002 | Nichols ................. 375/240.03 |
| 2003/0072364 | A1 * | 4/2003 | Kim et al. .............. 375/240.03 |
| 2003/0142751 | A1 | 7/2003 | Hannuksela |
| 2005/0286631 | A1 | 12/2005 | Wu et al. |
| 2006/0013298 | A1 | 1/2006 | Tong et al. |

FOREIGN PATENT DOCUMENTS

| | | |
|---|---|---|
| WO | WO 02096120 A1 * | 11/2002 |

OTHER PUBLICATIONS

The Motion Picture Experts Group, MPEG-2 Test Model 5: Chapter 10, "Rate Control and Quantization Control", Mar. 1993.*

U.S. Appl. No. 10/427,669, filed Apr. 30, 2003, Xiaochun Nie, et al.

U.S. Appl. No. 10/427,843, filed Apr. 30, 2003, Thomas Pun, et al.

U.S. Appl. No. 10/716,316, filed Nov. 17, 2003, Xiaochun Nie, et al.

Non-Final Office Action U.S. Appl. No. 10/427,669, filed Apr. 30, 2003, Xiaochun Nie, et al.

Final Office Action U.S. Appl. No. 10/427,669, filed Apr. 30, 2003, Xiaochun Nie, et al.

Non-Final Office Action U.S. Appl. No. 10/427,669, filed Apr. 30, 2003, Xiaochun Nie, et al.

Non-Final Office Action U.S. Appl. No. 10/427,843, filed Apr. 30, 2003, Thomas Pun, et al.

Non-Final Office Action U.S. Appl. No. 10/716,316, filed Nov. 17, 2003, Xiaochun Nie, et al.

Chow, K. W. and Liu, B. "Complexity based rate control for MPEG encoder". _Proceedings of the 1994 IEEE International Conference on Image Processing_ (ICIP-94), vol. 1, pp. 263-267.

Lee, L. W. et al. "On the Error Distribution and Scene Change for the Bit Rate Control of MPEG". _IEEE Transactions on Consumer Electronics_, vol. 39, Issue 3 (Jun. 11, 1993), pp. 545-554.

Teixeira, L. and Ribeiro, H. "Analysis of a Two STEP MPEG Video System". _Proceedings of the 1997 IEEE International Conference on Image Processing_, vol. 1, pp. 350-352.

Notice of Allowance of U.S. Appl. No. 10/427,669, Nov. 27, 2007 (mailing date), Xiaochun Nie, et al., now issued Patent 7,418,037.

Supplemental Notice of Allowance of U.S. Appl. No. 10/427,669, Jan. 22, 2008 (mailing date), Xiaochun Nie, et al., now issued Patent 7,418,037.

Notice of Allowance of U.S. Appl. No. 10/427,669, Mar. 17, 2008 (mailing date), Xiaochun Nie, et al., now issued Patent 7,418,037.

Restriction Requirement of U.S. Appl. No. 10/427,843, Oct. 31, 2006 (mailing date), Thomas Pun, et al.

Final Office Action of U.S. Appl. No. 10/427,843, Sep. 25, 2008 (mailing date), Thomas Pun, et al.

Final Office Action of U.S. Appl. No. 10/716,316, Jan. 11, 2008 (mailing date), Xiaochun Nie, et al.

Non-Final Office Action of U.S. Appl. No. 10/716,316, Sep. 12, 2008 (mailing date), Xiaochun Nie, et al.

Non-Final Office Action of U.S. Appl. No. 10/427,843, Dec. 5, 2008 (mailing date), Thomas Pun, et al.

Advisory Action of U.S. Appl. No. 10/716,316, Apr. 8, 2008 (mailing date), Xiaochun Nie, et al.

Final Office Action of U.S. Appl. No. 10/716,316, May 29, 2009 (mailing date), Xiaochun Nie, et al.

Portions of prosecution history of U.S. Appl. No. 10/427,669, Feb. 27, 2008, Xiaochun Nie, et al.

Portions of prosecution history of U.S. Appl. No. 10/427,843, Apr. 2, 2010, Thomas Pun, et al.

Portions of prosecution history of U.S. Appl. No. 10/716,316, Feb. 1, 2010, Xiaochun Nie, et al.

* cited by examiner

| 0 | 1 | 2 | 3 | 4 | 5 | 6 | 7 | 8 | 9 |
|---|---|---|---|---|---|---|---|---|---|
| 10 | 11 | 12 | 13 | 14 | 15 | 16 | 17 | 18 | 19 |
| | | | | | | | | | |
| | | | | | | | | | |
| | | | | | | | | | |
| | | | | | | | | | |
| | | | | | | | | | |

Figure 2

METHOD FOR IMPLEMENTING AN IMPROVED QUANTIZER IN A MULTIMEDIA COMPRESSION AND ENCODING SYSTEM

CLAIM OF BENEFIT TO PRIOR APPLICATIONS

The present patent application claims the benefit of the previous U.S. Provisional Patent Application entitled "Method for Implementing an Improved Quantizer in a Multimedia Compression and Encoding System", filed on Dec. 16, 2002 and having Ser. No. 60/433,915; and U.S. Provisional Patent Application entitled "Method for Implementing an Improved Quantizer in a Multimedia Compression and Encoding System", filed on Dec. 18, 2002 and having Ser. No. 60/434,322.

CROSS REFERENCE TO RELATED APPLICATIONS

The present patent application is related to commonly owned application Ser. No. 10/716,316, entitled "Method of Implementing Improved Rate Control for a Multimedia Compression and Encoding System," field on the same day.

FIELD OF THE INVENTION

The present invention relates to the field of multi-media compression systems. In particular the present invention discloses methods and systems for implementing a quantizer module that efficiently selects a quantizer value for each macroblock that will obtain a high compression ratio without sacrificing video image quality.

BACKGROUND OF THE INVENTION

Digital based electronic media formats are finally on the cusp of largely replacing the older analog electronic media formats. Digital compact discs (CDs) replaced analog vinyl records long ago. Analog magnetic cassette tapes are becoming increasingly rare. Second and third generation digital audio systems such as Mini-discs and MP3 (MPEG Audio—layer 3) are now taking market share from the first generation digital audio format of compact discs.

The domain of video media has been slower to move to digital storage and transmission formats than audio. The slower transition to digital has been largely due to the massive amounts of information required to accurately represent video in digital form. The massive amounts of digital information needed to accurately represent video require very high-capacity digital storage systems and high-bandwidth digital transmission systems.

However, video is now rapidly moving to digital storage and transmission formats. Faster computer processors, high-density storage systems, and new efficient compression and encoding algorithms have finally made digital video practical at consumer price points. The DVD (Digital Versatile Disc), a digital video storage system, has been one of the fastest selling consumer electronic products in years. DVDs have rapidly supplanted Video-Cassette Recorders (VCRs) as the pre-recorded video playback system of choice due their high video quality, very high audio quality, convenience, and wealth of extra features. Furthermore, the antiquated analog NTSC (National Television Standards Committee) video transmission system is now slowly being phased out in favor or the newer digital ATSC (Advanced Television Standards Committee) video transmission system. Direct Broadcast Satellite (DBS) television networks have long been using digital transmission formats in order to conserve precious satellite bandwidth.

Computer systems have been using various different digital video formats for a number of years. Among the best digital video compression and encoding systems used by computer systems have been the digital video compression and encoding systems backed by the Motion Pictures Expert Group that is better known by its acronym "MPEG." The three most well known and highly used digital video formats from MPEG are known simply as MPEG-1, MPEG-2, and MPEG-4. VideoCDs and low-end consumer-grade digital video editing systems use the relatively primitive MPEG-1 format. Digital Versatile Discs (DVDs) and the Dish Network brand direct broadcast satellite (DBS) television system use the higher-quality MPEG-2 digital video compression and encoding system. The MPEG-4 is rapidly being adapted by new computer based digital video encoders and players.

The MPEG-2 and MPEG-4 standards compress a series of video frames (or fields) and encode the compressed video frames into a digital stream. When encoding a video frame with the MPEG-2 and MPEG-4 systems, a video frame is divided into a rectangular grid of macroblocks. Each macroblock is then independently compressed and encoded.

When compressing the macroblocks from a video frame, an MPEG-2 or MPEG-4 encoder employs a quantizer module that selects a quantizer value (q) that is used to quantize individual numeric values associated with the macroblock. The smaller the quantizer value (q), the more bits will be used to encoded the macroblock. In order to efficiently compress the macroblocks that make up a video frame, the quantizer module must be able to select an appropriate a quantizer value (q). Ideally, the selected quantizer value (q) will maximize the compression of the video frame while ensuring a high quality compressed video frame.

SUMMARY OF THE INVENTION

Method For Implementing A Quantizer In A Multimedia Compression And Encoding System is disclosed. A quantizer is used to reduce the amount of data that must be transmitted. With a small quantizer value, the amount of data transmitted will be large. Conversely, with a large quantizer, the amount of data transmitted will be small.

In the MPEG standard, the quantizer is generally created with a base quantizer value and a quantizer adjustment. In a base quantizer adjustment stage, the encoder calculates a buffer occupancy accumulator which is defined as difference between the actual number of bits used to encode a frame and the requested bits for the previous video frame of the same video frame type. The buffer occupancy accumulator is used to improve the next estimate. In order to achieve a smooth quality transition, the system of the present invention limits the changes to the buffer occupancy accumulator with respect to the target number of bits of the current frame. For example, in one embodiment, the buffer occupancy accumulator for P-frames is allowed to change a maximum of 40% from the previous buffer occupancy accumulator and for I-frames (Intra-frames) the buffer occupancy accumulator is only allowed to change a maximum of 15% from the previous buffer occupancy accumulator. Limiting the change of the buffer occupancy accumulator will prevent one odd significantly different frame from significantly changing the quantization.

Furthermore, an encoder implementing the teachings of the present invention will improve upon the quantizer adjustment by making more accurate estimates of the amount information needed to encode each macroblock. In the reference MPEG-2 Test Model 5 implementation, a video encoder employs a uniform bit allocation model for all different video frame types such that the expected number of bits per macroblock is constant whether the frame is an intra-frame or an inter-frame. In the system of the present invention, the digital video encoder incorporates a more accurate distortion-rate model, wherein the distortion rate model used to estimate bits per macroblock may vary from frame type to frame type. Specifically, for frame types with motion compensation, the present invention exploits the correlation between the complexity of the macroblock and the number of bits needed. In the case of frame types without motion compensation, the present invention imposes a model that biases bit allocation towards smaller activity macro blocks.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which:

FIG. 2 illustrates a video frame that has been divided into a matrix of macroblocks.

DETAILED DESCRIPTION OF THE PREFERRED EMBODIMENT

A method and system for efficiently selecting a quantizer value in a multi-media compression and encoding system is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the MPEG-4 multimedia compression and encoding system. However, the same techniques can easily be applied to other types of compression and encoding systems.

Multimedia Compression and Encoding Overview

Figure 1:
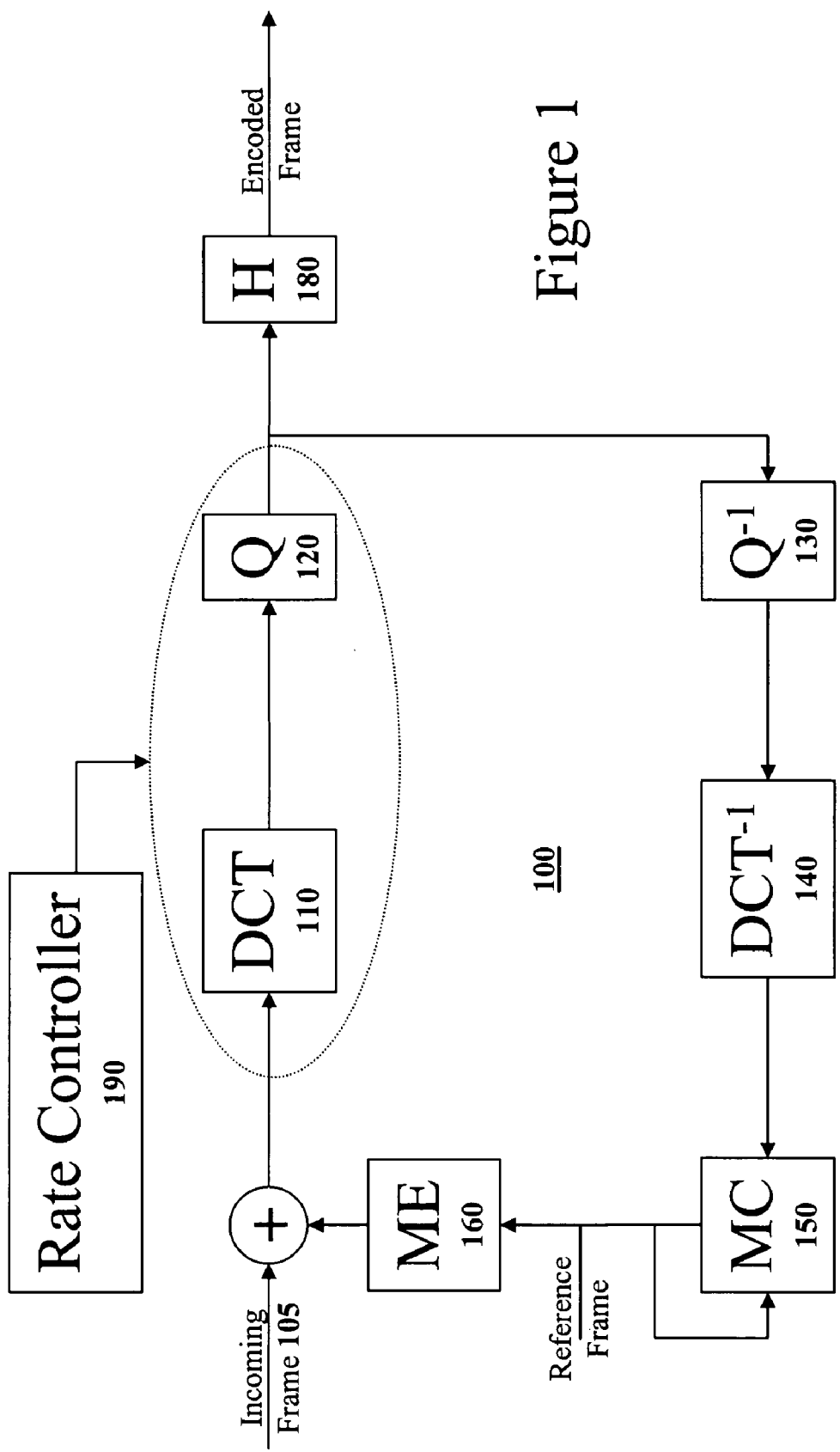
FIG. 1 illustrates a block diagram of a digital video encoder with which some embodiments are implemented.

FIG. 1 illustrates a high level block diagram of a typical digital video encoder 100 upon which some embodiments are implemented. The digital video encoder 100 receives incoming video stream 105 of video frames at the left of the block diagram. Each video frame is processed by a Discrete Cosine Transformation (DCT) unit 110. The video frame may be processed independently (an intra-frame) or with reference to information from other video frames received from the motion compensation unit (an inter-frame). A Quantizer (Q) unit 120 then quantizes the information from the Discrete Cosine Transformation unit 110. The quantized frame information is then encoded with an entropy encoder (H) unit 180 to produce an encoded video bitstream.

Since an inter-frame encoded video frame is defined with reference to other nearby video frames, the digital video encoder 100 needs to create a copy of how each video frame will appear within a digital video decoder such that inter-frames may be encoded. Thus the lower portion of the digital video encoder 100 is actually a digital video decoder. Specifically, inverse quantizer ($Q^{-1}$) 130 reverses the quantization of the video frame information and inverse Discrete Cosine Transformation ($DCT^{-1}$) unit 140 reverses the Discrete Cosine Transformation of the video frame information. After all the DCT coefficients are reconstructed from iDCT, the motion compensation unit will use the information, along with the motion vectors, to reconstruct the video frame.

The decoded video frame may then be used as a reference video frame to encode other inter-frames that are defined relative to information in the decoded video frame. Specifically, a motion compensation (MC) unit 150 and a motion estimation (ME) unit 160 are used to determine motion vectors and generate differential values used to encode inter-frames.

A rate controller 190 receives information from many different components in a digital video encoder 100 and uses the information to allocate a bit budget for each video frame. The bit budget determines how many bits should be used to encode the video frame. Ideally, the bit budget will be assigned in a manner that will generate the highest quality digital video bit stream that complies with a specified set of restrictions. Specifically, the rate controller 190 attempts generate the highest quality compressed video stream without overflowing memory buffers (exceeding the amount of available memory by sending more information than can be stored) or underflowing memory buffers (not sending frames fast enough such that a decoder runs out of frames to display) in the decoder.

Macroblocks and Quantization

Figure 2:
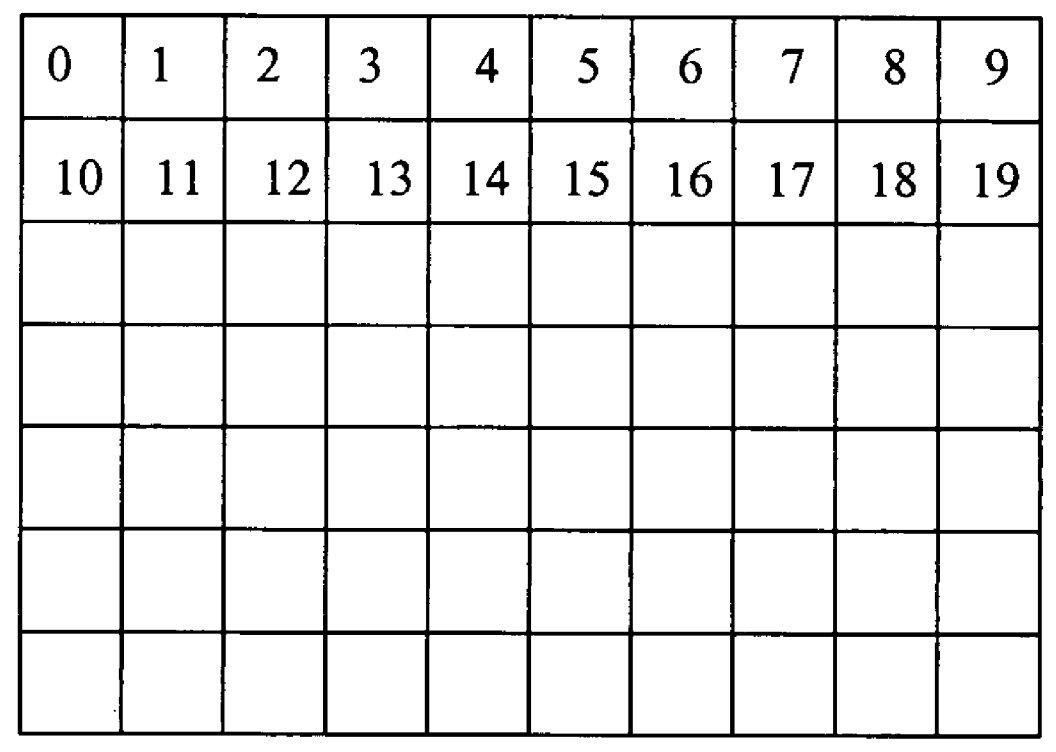

In MPEG-2, MPEG-4, and many other video encoding systems, each video frame is divided into a grid of 'macroblocks' wherein each macroblock represents a small area of the video frame. FIG. 2 illustrates an example of a rectangular video frame that has been divided into a matrix of macroblocks. In an MPEG-4 video encoding systems, the macroblocks each contain a 16×16 matrix of pixels. The macroblocks in FIG. 2 are sequentially numbered starting from the upper left corner and scanning horizontally and downward. However, various different shapes and/or sizes of macroblock may be used by various different video encoding systems to encode video frames.

As set forth in the previous section, the macroblocks in a MPEG-4 system are processed by a Discrete Cosine Transform (DCT) unit 110 and then quantized by a Quantizer unit 120 before being entropy encoded. The Quantizer unit 120 performs a quantization on the macroblock data in order to reduce the amount information needed to represent the macroblock data.

The Quantizer unit 120 operates by selecting a quantizer value (q) that will be used to quantize a particular macroblock. In certain digital video encoding systems, the quantizer value (q) used for a particular macroblock can only change a very limited amount from the quantizer value (q) used by the previous adjacent macroblock. Specifically, the quantizer value (q) can only change from the previous quantizer value (q) by a difference in the range of −2, −1, 0, +1, or +2. In other digital video encoding systems, the quantizer value (q) may be set freely to any value within the acceptable range for the quantizer.

Quantization Parameter Creation

The present invention provides a method of adaptively assigning a quantizer (q) in a region based video encoding scheme such as the MPEG video encoding schemes. The method of the present invention is based on the rate control module in the MPEG-2 Test Model 5 (TM5) code set forth in the MPEG-2 documentation. In the TM5 rate control module, a base quantizer parameter (q_base) and a quantizer adjustment (q_delta) to the base quantizer parameter are computed for each individual macroblock in a video frame. The base quantizer parameter (q_base) and the quantizer adjustment (q_delta) are then combined as set forth in the following equation:

$$q = \text{ClipToValidRange}(q\_base + q\_delta)$$

Detailed information on the MPEG-2 Test Model 5 (TM5) can be found in the official MPEG-2 documentation and on the Internet.

The present invention improves upon the generation of both the base quantizer parameter (q_base) and the quantizer adjustment (q_delta). One specific implementation is described in three separate stages: (1) Scene Analysis, (2) Base Quantizer Assignment, and (3) Quantizer Adjustment. The three stages are described individually in the following sections.

The reader of this document should note that the teachings of present invention may be practiced while making changes to the specific implementation disclosed in order to adapt the invention for other situations. For example, the present invention is disclosed with reference to an MPEG based digital video encoding standard that divides video frames into 16×16 macroblocks and 8×8 macroblocks. However, the teachings of the present invention can be used with any region based digital video encoding system.

Stage 1: Scene Analysis

In the Scene Analysis stage, the system of the present invention identifies different types of textures (smooth and rough). Some coding artifacts (such blockiness) are more visible in some types of textures (smooth textures) than the others (rough textures) such that it is advantageous to determine the type of texture a particular macroblock contains.

Minimum variance of the four 8×8 macroblocks is used as a variance 'activity' measure for each macroblock. A large variance is an indication of a rough texture where more quantization noise can be hidden. A smaller variance generally indicates a smoother area that should not be quantized as heavily. In one embodiment, the system of the present invention calculates a macroblock activity measure, referred to as 'mbact', for each macroblock j as follows:

$$\text{mbact}[j=]=1.0 + \min(\text{var}(\text{block}\_j[0\ldots 4]))$$

In order to limit the dynamic range of this measurement, each individual macroblock activity measure for each macroblock is normalized. The macroblock activity measure normalization (mbactN) for a macroblock j can be calculated as follows:

$$\text{mbact}N[j] = \text{normalize}(\text{mbact},j,2)$$

where $$\text{normalize}(in\_ptr,j,f) = (f*in\_ptr[j] + \text{avg\_in})/(in\_ptr[j] + f*\text{avg\_in})$$

in which avg_in is the average of all the elements in the 'in_ptr' array and 'f' is a scaling factor.

Stage 2: Base Quantizer Assignment

After performing the scene analysis of Stage 1, each macroblock j is then assigned a base quantizer value, q_base. The base quantizer value may be calculated as follows:

$$q\_base = 31 * \text{mbact}N[j] * d\_tm5/r\_tm5$$

where
- mbactN[j]: normalized activity for the $j^{th}$ macroblock
- r_tm5: reaction parameter, constant for each frame type (2 * bit rate/frame_rate=# of bits in 2 frames)
- d_tm5: buffer occupancy accumulator defined as the difference between the actual bits used and the requested bits for the previous frame of the same type.

After each video frame is coded, the buffer occupancy accumulator (d_tm5) will be updated to reflect the difference in the bits actually used and the bits that were requested for the previous frame of the same type. In order to achieve a smooth quality transition, the changes are limited (e.g. clipped, scaled, or both) with respect to the target number of bits inputted. Therefore, the base quantizer parameter (q_base) is then limited to an adaptively determined finite range in order to always allow the possibility of quantizer parameter adjustment.

Stage 3: Quantizer Adjustment

The final quantizer value (q) is the sum of the base quantizer parameter (q_base), as set forth in the previous section, and a quantizer adjustment (q_delta). Furthermore, the final quantizer value (q) is clipped to ensure that the final quantizer value (q) remains within the valid range of quantizer values. Thus, the final quantizer value (q) may be calculated as follows:

$$q = \text{ClipToValidRange}(q\_base + q\_delta)$$

The quantizer adjustments (q_delta) to the base quantization parameter (q_base) are made to correct for a macroblock-level bit buffer overshoot or buffer undershoot. The video encoder tracks, per macroblock, the difference between the number of bits expected to be used (bitsShouldHaveUsed) and actual number of bits (bitsUsed) generated.

$$\text{delta} = \text{bitsUsed} - \text{bitsShouldHaveUsed}$$

$$q\_delta = K * \text{delta}$$

where:
K is a scaling factor

The system of the present invention uses various different models, as will be described in detail in the next section, in order to:
(1) Model the number of expected bits (bitsShouldHaveUsed), and
(2) Provide a rate sensitive scaling factor, K, for delta.

In the system of the present invention, the modeling of the number of expected bits for a frame (bitsShouldHaveUsed) is dependent on the type of frame (intra-frame or inter-frame) that is being encoded. Specifically, the modeling of the number of expected bits is performed differently for video frames that include motion compensated macroblocks and video frames that do not include motion compensated macroblocks.

Modeling Expected Bits for Frame Types that Include Motion Compensated Macroblocks The Normalized Sum of Absolute Differences (NSAD) of a macroblock may be used to predict the number of bits expected for the macroblock relative to other macroblocks. The NSAD for inter-macroblocks is the usual sum of absolute difference (SAD) of the motion compensated residual which is then normalized to per pixel values. For intra-macroblocks, the NSAD is the mean removed sum of pixel values, again normalized to per pixel values. Thus, for the $j^{th}$ macroblock:

$$NSAD[j]=\text{normalize}(SAD,j,3)$$

$$mbBitsExpected[j]=NSAD[j]*T\_tm5/SumOfNSAD$$

BitsShouldHaveUsed[j]=sum of mbBitsExpected[j] up to the $(j-1)^{th}$ macroblock where
SumOfNSAD=Sum of NSAD[j] over all j
normalize( ) is defined above in STAGE 1.
T_tm5 is target number of bits of the current frame The preceding formula indicates that the system will allocate more bits when there is a larger Sum of Absolute Differences (SAD) value. Thus, a complex residual will require more bits to be allocated. Similarly, the system will allocate fewer bits when there is a smaller Sum of Absolute Differences (SAD) value. Thus, a simple residual requires fewer less bits.

Modeling Expected Bits for Frames that do not Include Motion Compensated Macroblocks If the motion estimator is not run for the current frame, then the macroblock activity measure normalization (mbactN as defined in Stage 1) is adjusted and used as a guideline on how many bits should have been used for the macroblock. The following section of pseudo-code models the expected bit allocations for a video frame that does not contain any motion compensated macroblocks. Thus, for the $j^{th}$ macroblock:

$$InvNMbAct[j]=1/\text{normalize}(mbactN[j],j,3)$$

$$mbBitsExpected[j]=InvNMbAct[j]*T\_tm5/SumOfInvNMbAct$$

BitsShouldHaveUsed[j]=sum of mbBitsExpected[j] up to the $(j-1)^{th}$ macroblock where
SumOfInvNMbAct=Sum of InvNMbAct[j] over all j
normalize( ) is defined above in STAGE 1.
T_tm5 is the target number of bits of the current frame Note that, in the preceding code, a smaller mbactN[j] value for a macroblock j will result in a bigger InvNMbAct[j], which thus translates to more bits being expected.

Next, the system handles a scale factor for delta. The quantizer adjustment (q_delta) is computed as a scaled version of 'delta' as follows:

$$q\_delta=K*delta$$

$$K=mbactN[j]*\text{scale\_function}(j,totalNumMacroBlocks, bpp,macroblockType)$$

Where
j: macroblock position
totalNumMacroBlocks: number of macroblocks in the frame
bpp: bits per pixel, a measure of compression ratio macroblockType: macroblock coding method (such as Intra, bipredicted)

The scale function (scale_function) is different for intra-macroblocks than for other types of macroblocks. In one implementation, the scale function for intra-macroblocks may be defined as follows:

$$\text{scale\_function}=1/(bpp*totalNumMacroBlocks*8)$$

and the scale function for macroblocks that are not intra-macroblocks may be defined as follows:

$$\text{scale\_function}=1/(bpp*totalNumMacroBlocks*4)$$

Improved Base Quantizer Assignment

In stage 2, the base quantizer assignment stage, the buffer occupancy accumulator (d_tm5) is the difference between the actual bits used and the requested bits for the previous video frame of the same video frame type (I-frame, P-frame, etc.). After each video frame is encoded, the buffer occupancy accumulator (d_tm5) will be updated to reflect the difference in bits.

In order to achieve a smooth quality transition, the system of the present invention limits the changes (e.g. clipped, or scaled, or both) to the buffer occupancy accumulator (d_tm5) with respect to the target number of bits of the current frame. The extent to which the buffer occupancy accumulator (d_tm5) is allowed to change depends on the video frame type (Intra-frame or Inter-frame). For example, in one embodiment, the buffer occupancy accumulator (d_tm5) for P-frames is allowed to change a maximum of 40% from the previous the buffer occupancy accumulator (d_tm5) and for I-frames (Intra-frames) the buffer occupancy accumulator (d_tm5) is only allowed to change a maximum of 15% from the previous the buffer occupancy accumulator.

Figure 3:
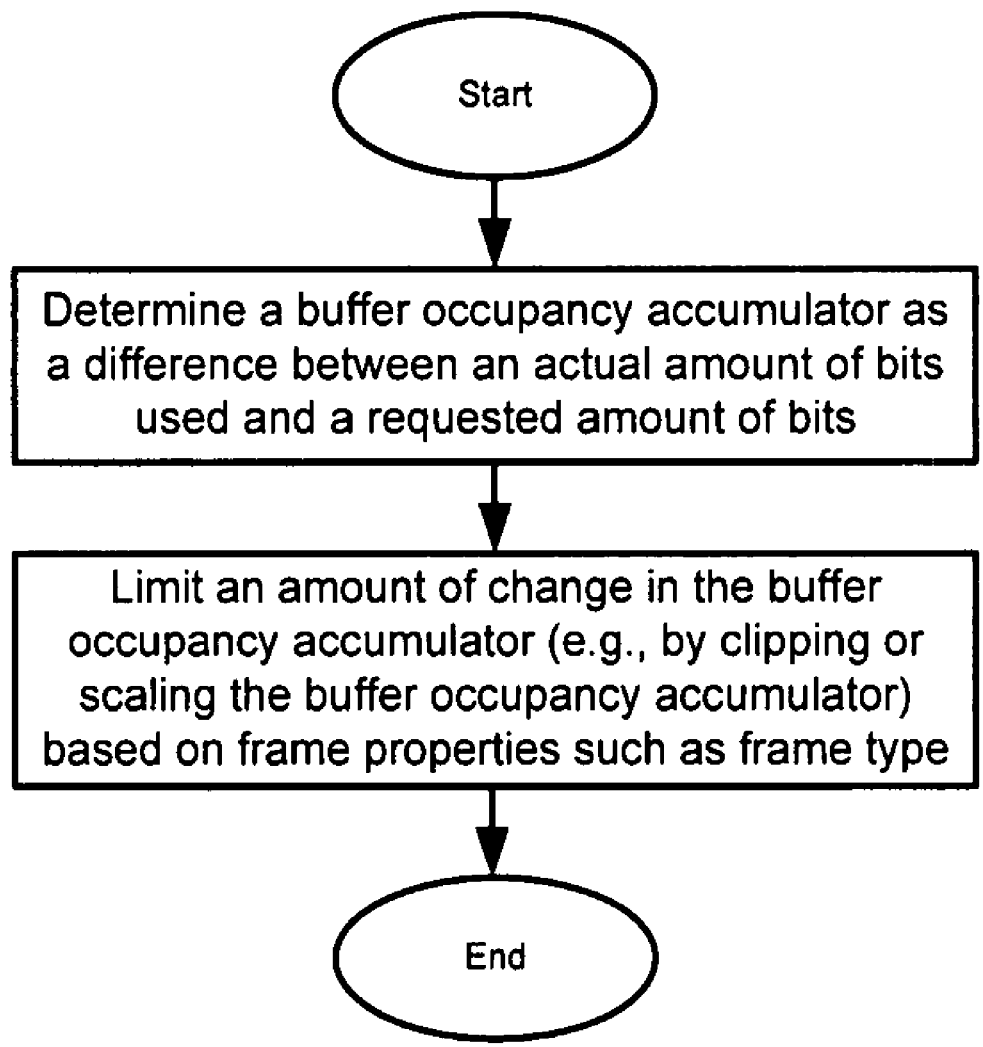
FIG. 3 illustrates the base quantizer assignment process in some embodiments.

Later, the base quantization parameter (q_base) is limited to stay within an adaptively determined finite range in order to always allow for further quantizer adjustment. For example, suppose the digital video encoder grossly overshoots the bit budget for the $(n-1)^{th}$ frame and the $j^{th}$ macroblock of the $n^{th}$ frame is undershooting the bit budget. In this case, if the base quantization parameter (q_base) is not clipped to a finite range, the digital video encoder may not be able to adjust for the undershoot. FIG. 3 illustrates the above described base quantizer assignment process in some embodiments.

Improved Quantizer Adjustment

The present invention improves the methods by which a digital video encoder estimates the amount information needed to encode a macroblock. Specifically, the digital video encoder must determine the number of bits that will be allocated to encode each macroblock. In the reference MPEG-2 Test Model 5 implementation, the video encoder employs a uniform bit allocation model for all different video frame types (i.e. the expected number of bits per macroblock is constant whether the frame is an intra-frame or an inter-frame). In the present invention, the digital video encoder incorporates a distortion-rate model, where the distortion rate model may vary from frame type to frame type.

In the case of frame types with motion compensation, the invention exploits the correlation between the complexity of the macroblock (from SAD and activity measure of each macroblock) and the number of bits needed. In the case of frame types without motion compensation, the invention imposes a model that biases bit allocation towards smaller activity macroblocks.

The scaling factor, K, in the following equation is enhanced in the system of the present invention:

$$q\_delta=K*delta$$

In the reference MPEG-2 Test Model 5 implementation, the scaling factor K was defined using the following formula:

$$K=31*mbactN[j]/r\_tm5$$

where
- mbactN[j]: normalized activity for the j th macroblock
- r_tm5: reaction parameter, constant for each type of frame, and dependent on the data rate.
    (2×bit rate/frame rate=>average number of bits for 2 frames)

The system of the present invention improves the scaling factor K by introducing dependence on the macroblock position (j), the bits per pixel of the current frame (bpp), and the macroblock type (intra, inter, bipredicted, etc). These additional factors influence how aggressive the adjustment can made be through a scaling factor referred to as the "scale_function."

$$K=mbactN[j]*scale\_function(j,totalNumMacroBlocks,bpp,macroblockType)$$

Where
- j: macroblock position
- totalNumMacroBlocks: number of macroblocks in the frame
- bpp: bits per pixel, a measure of compression ratio
- macroblockType: macroblock coding method (such as Intra, bipredicted)

Figure 4:
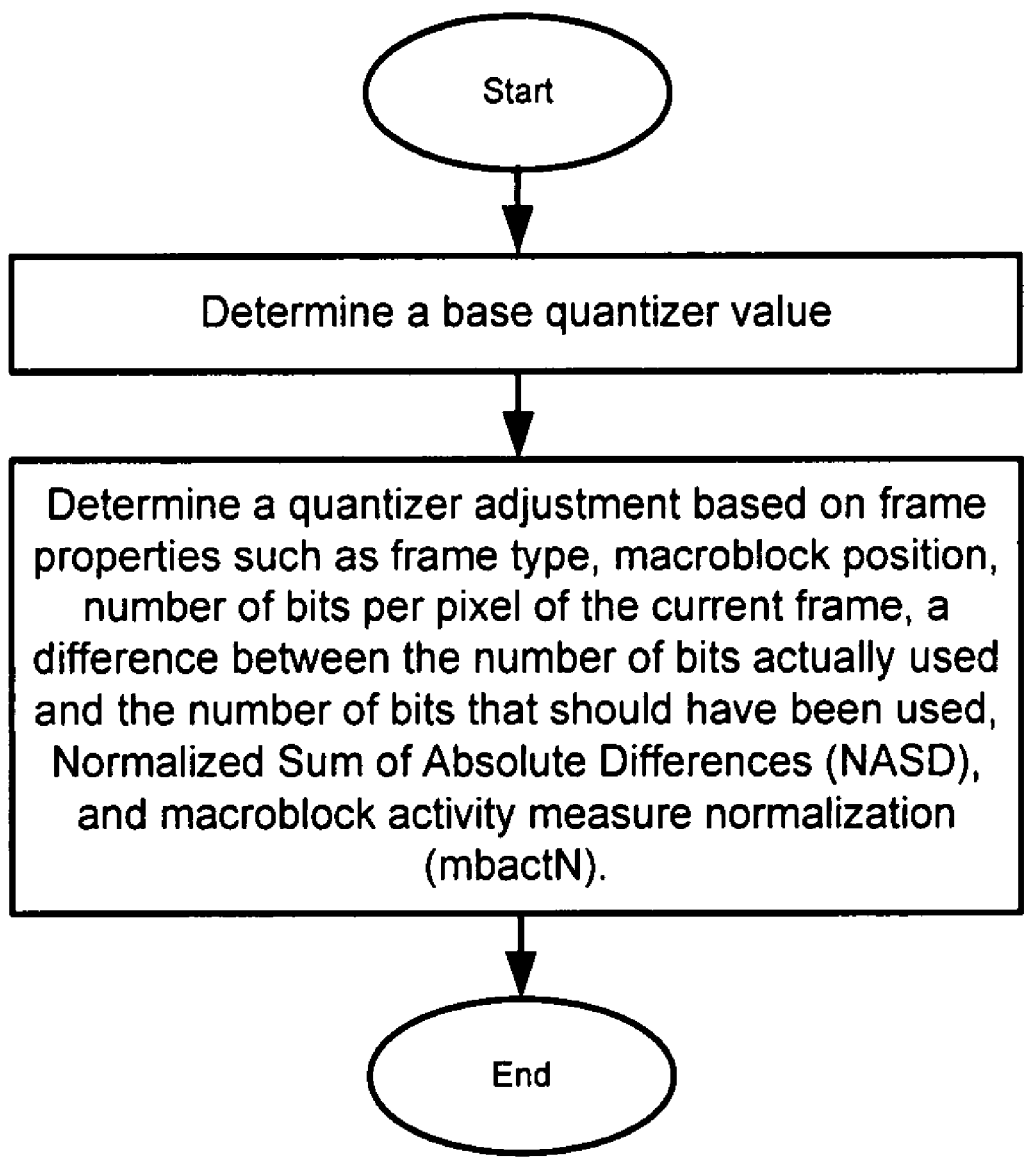
FIG. 4 illustrates the quantizer adjustment process in some embodiments.
Figure 5:
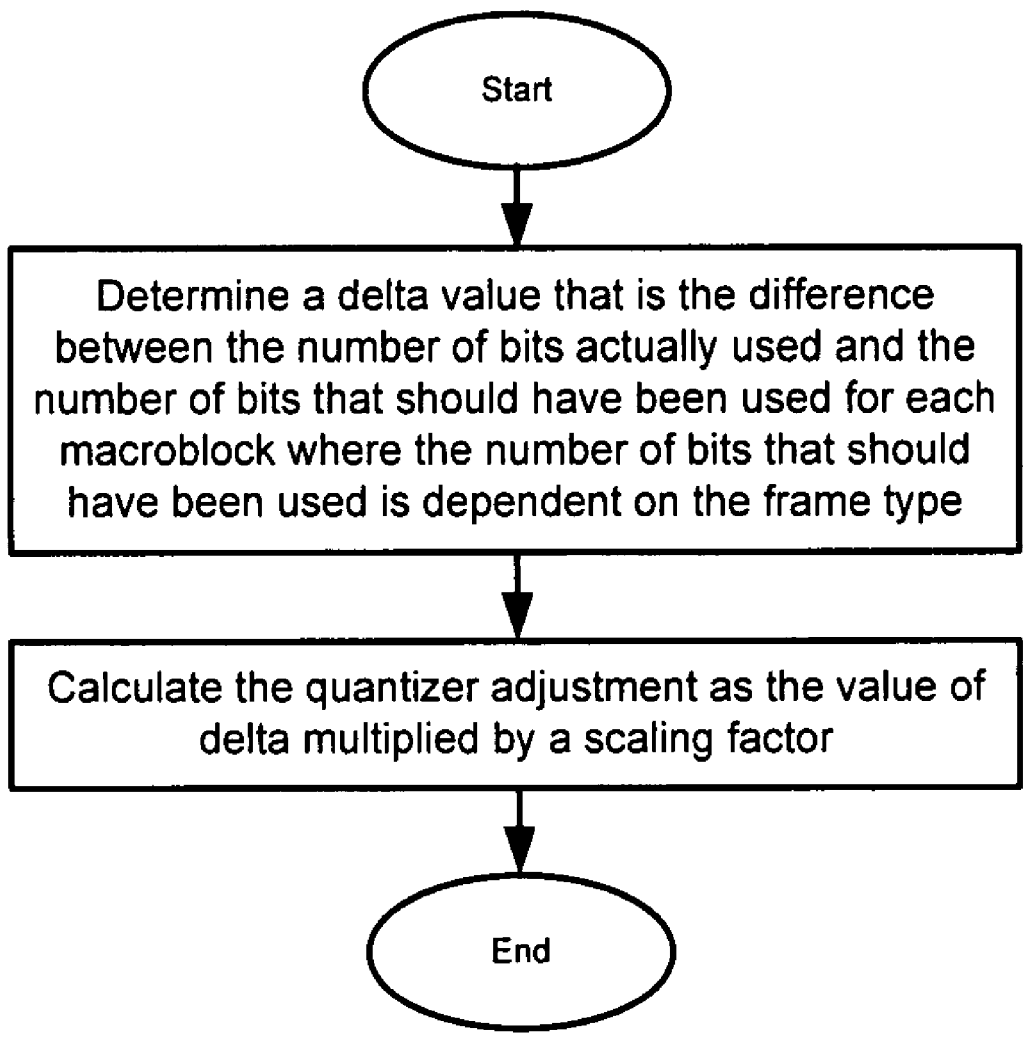
FIG. 5 illustrates a process for calculation of the delta value used in computing the quantizer adjustment in some embodiments.

FIG. 4 illustrates the above described quantizer adjustment process in some embodiments. FIG. 5 illustrates a process for calculation of the delta value used in computing the quantizer adjustment in some embodiments.

The foregoing has described a system for performing quantization in a multi-media compression and encoding system. It is contemplated that changes and modifications may be made by one of ordinary skill in the art, to the materials and arrangements of elements of the present invention without departing from the scope of the invention.

We claim:

1. A method of quantizing a particular macroblock of a particular frame in a sequence of digital video frames, the particular frame having a frame type, said method comprising:
   - determining a buffer occupancy accumulator for the particular frame as a difference between an actual amount of bits used to encode a previous frame having the same frame type as the particular frame and a requested amount of bits for the previous frame having the same frame type as the particular frame;
   - limiting a maximum amount of change differently for each frame type in said buffer occupancy accumulator from its previous value for the same frame type; and
   - encoding said particular macroblock using a quantizer value computed based on said buffer occupancy accumulator,
   - wherein the determining, limiting, and encoding are performed by a digital video encoder.

2. The method of claim 1, wherein said limiting the maximum amount of change in said buffer occupancy accumulator is performed by clipping said buffer occupancy accumulator with respect to a target number of bits of the particular frame.

3. The method of claim 1, wherein said limiting the maximum amount of change in said buffer occupancy accumulator is performed by scaling said buffer occupancy accumulator with respect to a target number of bits of the particular frame.

4. The method of claim 1, wherein the frame type is one of an intra-frame encoded and an inter-frame encoded.

5. The method of claim 1, wherein said limiting the maximum amount of change in the buffer occupancy accumulator comprises limiting the change to a particular percentage of a value of the buffer occupancy accumulator from the previous frame having the same frame type as the particular frame.

6. A non-transitory computer readable medium storing a computer program which when executed by a processor quantizes a particular macroblock of a particular frame in a sequence of digital video frames, the particular frame having a frame type, the computer program comprising sets of instructions for:
   - determining a buffer occupancy accumulator for the particular frame as a difference between an actual amount of bits used to encode a previous frame having the same frame type as the particular frame and a requested amount of bits for the previous frame having the same frame type as the particular frame;
   - limiting a maximum amount of change differently for each frame type in said buffer occupancy accumulator from its previous value for the same frame type; and
   - encoding said particular macroblock using a quantizer value computed based on said buffer occupancy accumulator.

7. The computer readable medium of claim 6, wherein said limiting the maximum amount of change in said buffer occupancy accumulator is performed by clipping said buffer occupancy accumulator.

8. The computer readable medium of claim 6, wherein said limiting the maximum amount of change in said buffer occupancy accumulator is performed by scaling said buffer occupancy accumulator.

9. The computer readable medium of claim 6, wherein the frame type is one of an intra-frame encoded and an inter-frame encoded.

10. A method of quantizing a particular macroblock of a particular frame of a particular frame type in a sequence of digital video frames, said method comprising:
    - determining a base quantizer value;
    - determining a quantizer adjustment based on multiplying a scaling function by (i) a difference between a number of bits actually used to encode previous macroblocks of the particular frame of the particular frame type and a number of bits that should have been used to encode the previous macroblocks of the particular frame and (ii) a normalized activity level of the particular macroblock, wherein the scaling function is different for different macroblock coding methods; and
    - encoding said particular macroblock based on a quantizer value computed as a sum of the base quantizer value and the quantizer adjustment,
    - wherein said determining the base quantizer value, determining the quantizer adjustment, and encoding are performed by a digital video encoder.

11. The method of claim 10, wherein the scaling function is a function of a position of the particular macroblock within the particular frame.

12. The method of claim 10, wherein the scaling function is a function of bits per pixel of the particular frame.

13. The method of claim 10, wherein said number of bits that should have been used is calculated in a manner that takes into account macroblock coding methods.

14. The method of claim 10, wherein said quantizer adjustment is further based on a Normalized Sum of Absolute Differences (NSAD).

15. The method of claim 10, wherein said quantizer adjustment is further based on a macroblock activity measure normalization (mbactN).

16. The method of claim 10, wherein determining the base quantizer value comprises clipping said base quantizer value to produce an adaptively determined finite range.

17. The method of claim 10, wherein the macroblock coding method is one of intra-macroblock and non-intra-macroblock.

18. A method of determining a quantizer value for quantizing a particular macroblock of a particular frame having a particular frame type in a sequence of digital video frames, said method comprising:

when the particular frame is a first frame type, computing a number of bits that should have been used to encode all previously encoded macroblocks of the particular frame by using a first formula;

when the particular frame is a second frame type, computing the number of bits that should have been used to encode said all previously encoded macroblocks of the particular frame by using a second formula;

determining a delta value comprising a difference between a number of bits actually used to encode said all previously encoded macroblocks of the particular frame and the computed number of bits that should have been used; and quantizing said particular macroblock using a quantizer value computed as a sum of a base quantizer value and a quantizer adjustment, said quantizer adjustment computed by multiplying (i) the determined delta value, (ii) a scaling function that is different for different macroblock coding methods, and (iii) a normalized activity level of the particular macroblock, wherein the computing, determining, and quantizing are performed by a digital video encoder.

19. The method of claim 18, wherein the frame type is one of an intra-frame encoded and an inter-frame encoded.

20. The method of claim 18, wherein the first frame type includes motion compensated macroblocks, and the first formula is based on a normalized sum of absolute differences that allocates more bits for the particular frame when a motion compensated residual for the macroblocks is more complex.

21. The method of claim 18, wherein the second frame type does not include motion compensated macroblocks, wherein the second formula is based on a normalized macroblock activity measure that allocates more bits for the particular frame if the macroblock activity is smaller.

22. The method of claim 18, wherein the scaling function is a function of a number of macroblocks in the particular frame.

\* \* \* \* \*